United States Patent [19]

Norian et al.

[11] Patent Number: 4,963,429
[45] Date of Patent: Oct. 16, 1990

[54] THIN ORIENTED POLYMER FILMS CONTAINING METAL-ORGANIC COMPOUNDS

[75] Inventors: Karl H. Norian, Center Valley, Pa.; Ulrich Rieck, Elmshorn/Kolln-Reisiek, Fed. Rep. of Germany

[73] Assignee: Wea Manufacturing Inc., Olyphant, Pa.

[21] Appl. No.: 291,546

[22] Filed: Dec. 29, 1988

[51] Int. Cl.$^5$ ............................. B32B 5/16; C08K 5/04
[52] U.S. Cl. ..................................... 428/220; 428/323; 428/328; 428/329; 428/457; 428/910; 524/356; 524/357; 524/395; 524/396; 524/399
[58] Field of Search ............... 428/220, 323, 328, 329, 428/910, 457; 524/396, 399, 356, 357, 395

[56] References Cited

U.S. PATENT DOCUMENTS

| | | | |
|---|---|---|---|
| 3,905,947 | 9/1975 | Cowell et al. | 524/396 |
| 3,991,130 | 11/1976 | Cowell et al. | 428/457 |
| 4,027,366 | 6/1977 | Millar et al. | 428/328 |
| 4,243,460 | 1/1981 | Nagler | 428/328 |
| 4,243,710 | 1/1981 | Magrini et al. | 428/328 |
| 4,251,576 | 2/1981 | Osborn et al. | 428/331 |
| 4,728,554 | 3/1988 | Goldberg et al. | 428/329 |
| 4,752,202 | 6/1988 | Gomi et al. | 428/910 |
| 4,818,325 | 4/1989 | Hiraiwa et al. | 524/394 |

OTHER PUBLICATIONS

"Metal-Containing Polymer Systems" edit. by J. E. Sheats et al., Plenum Press, New York (1985).
H. W. Leonhardt et al., *Plaste Kautschuk*, 31,192 (1984).
P. H. Geil, *Polymer Single Crystals*, Interscience Publishers, New York (1963).
"A Metal-Polymer Interface Study Using Electropolymerized Acrylonitriles on Nickel Surfaces" by G. Lecayon, P. Viel, C. LeGressus, C. Boiziau, S. Leroy, J. Perreau and C. Reynaud, vol. 1, No. 1, 1987, pp. 86-93.
"Use of Surface and Thin Film Analysis Techniques to Study Metal-Organic and Metal-Polymer Interaction: A Review" by H. G. Tompkins, *Thin Solid Films*, vol. 119, 1984, pp. 337-348.
"XPS Studies of Metal/Polymer Interfaces-Thin Films of Al on Polyacrylic Acid and Polyethylene" by B. M. DeKoven and P. L. Hagans, *Applied Surface Science*, vol. 27, 1986, pp. 199-213.
"Metal Doped Polymer Films Prepared by Plasma Polymerization and Their Potential Applications" by H. Biederman, *Vacuum*, vol. 34, Nos. 3-4, 1984, pp. 405-410.

(List continued on next page.)

*Primary Examiner*—Ellis P. Robinson
*Assistant Examiner*—Archene Turner
*Attorney, Agent, or Firm*—Gottlieb, Rackman & Reisman

[57] ABSTRACT

Very thin polymer/MOC film, on the order of 500A to 1000A thick, is prepared by dissolving both the polymer and the MOC sequentially in the same solvent to obtain an emulsion consisting of a discontinuous phase of finite globules of the MOC solution dispersed in a continuous phase of the polymer solution, then partially evaporating the solvent from a layer of the emulsion, and finally subjecting the resultant polymer/MOC layer, while the solvent continues to evaporate, to a controlled treatment permitting attainment of a desired arrangement of the MOC phase in and throughout the film, depending on the specific film properties sought to be achieved, while the polymer crystallizes. The treatment may be a drawing operation or, if the metal component of the MOC is magnetic, the application of a magnetic field either parallel or perpendicular to the plane of the layer. Such films are useful as dielectrics for capacitors and may further be useful as shielding materials for integrated circuits to protect the same against electromagnetic interference, as data storage devices, and as electromagnetic wavelength selectors. Film of greater thickness can be formed by winding or folding the starting film up to the thickness of several thousand layers.

14 Claims, 9 Drawing Sheets

OTHER PUBLICATIONS

"Mechanism of Oxidation at a Copper-Polyethylene Interface, II, Penetration of Copper Ions in the Polyethylene Matrix" by D. L. Allara, C. W. White, R. L. Meek and T. H. Briggs, *Journal of Polymer Science: Polymer Chemistry Edition*, vol. 14, 1976, pp. 93–104.

"Ion Clustering Studies in Poly(Butadiene-Styrene-4-Vinylpyridine) Crosslinked by Iron(III) Chloride, Differential Enthalpic Analysis and Electron Microscopy" by M. Pineri, C. Meyer and A. Bourret, *Journal of Polymer Science: Polymer Physics Edition*, vol. 13, 1975, pp. 1881–1891.

"Ion-Clustering and Viscoelastic Properties in Poly(Butadiene-Styrene-4-Vinylpyridine) Crosslinked by Nickel Chloride" by C. T. Meyer and M Pineri, *Polymer*, vol. 17, May 1976, pp. 382–386.

"Complexing of some Transition Metal Ions with Poly(Heptyl Itaconate) Containing Tetraethylenepentamine Side Chains" by J. M. G. Cowie and N. M. A. Wadi, *Polymer*, vol. 26, Sep. 1985, pp. 1566–1570.

"A New Method for the Preparation of High Modulus Thermoplastic Films" by J. Petermann and R. M. Gohil, *Journal of Materials Science (Letters)*, vol. 14, 1979, pp. 2260–2264.

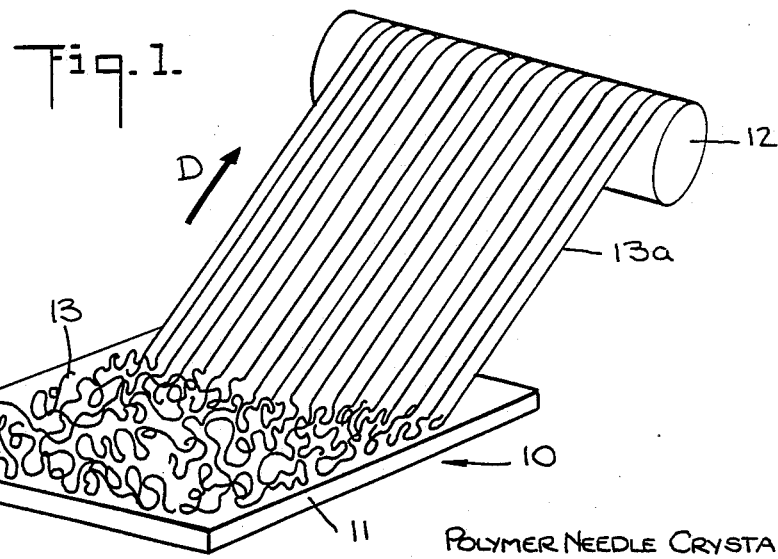
Fig. 1.
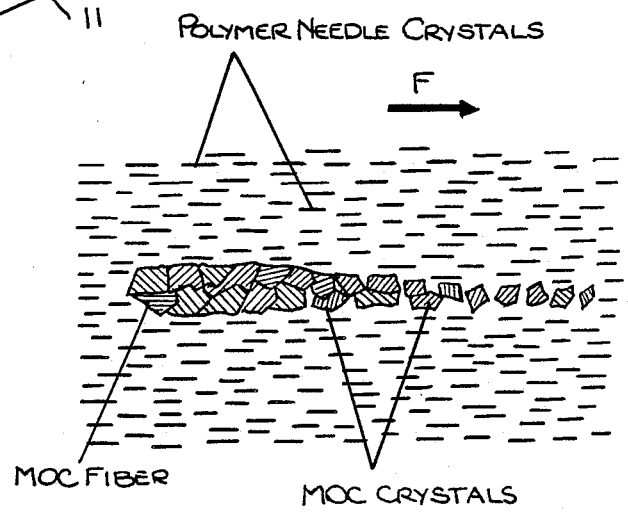
Polymer Needle Crystals
MOC Fiber   MOC Crystals
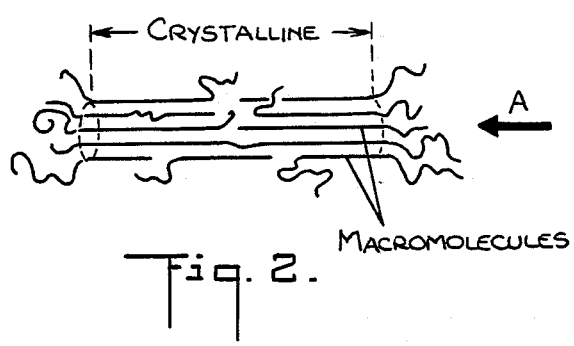
Fig. 2.
Crystalline
Macromolecules
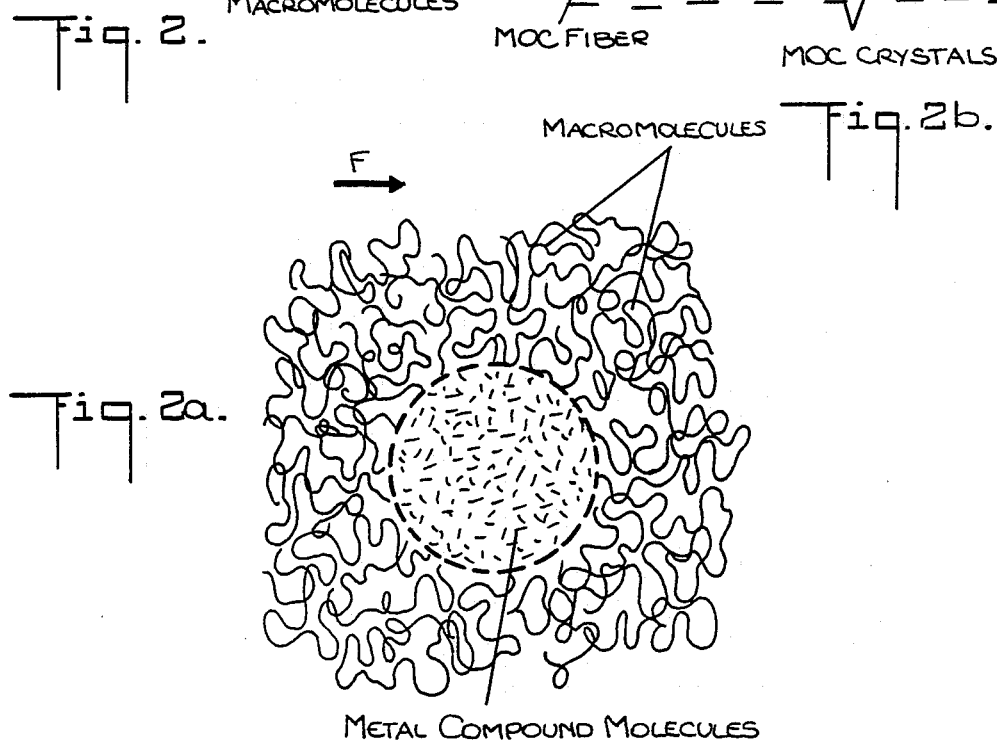
Fig. 2a.
Macromolecules
Fig. 2b.
Metal Compound Molecules — Polymer Molecules
~ MOC Molecules Metal Compound Molecules Macromolecules Polymer Lamellae 1.0 μm 0.5 μm

THIN ORIENTED POLYMER FILMS CONTAINING METAL-ORGANIC COMPOUNDS

This invention relates to thin oriented polymer/metal-organic compound (MOC) films and to methods of making the same.

BACKGROUND OF THE INVENTION

Polymers are well known as alternatives for a wide variety of common materials, and they have successfully replaced these materials in many different applications. However, numerous desirable properties, for example, such as electrical conductivity, modified dielectric constant, etc., cannot be achieved in pure polymers. To overcome these difficulties, innovative efforts have concentrated in the past few years on the development of systems which meet these needs in a better way. One such avenue of approach has been the formation of polymer/metal systems designed to combine, at least partially, the properties of both polymeric and metallic materials.

Polymer/metal systems of various types are well known, therefore, as are common procedures for obtaining such systems, e.g., the dispersion of metal powders or fibers in polymeric resins or the addition of metallic traces in the form of catalysts or organo-metallic complexes during the polymerization process. Various types of such procedures have been extensively described in the literature. Among these are: Mixing of fine metal powders with the polymeric component of the system, followed by hot pressing and/or extrusion; electropolymerization; catalytic copolymerization; in situ sputtering of metals onto polymer substrates; plasma polymerization; lamination of both components; and intermixing of inorganic metal salt solutions with polymer solutions. However, none of these methods is able to generate very thin polymer/metal films, i.e., films the thickness of which is on the order of magnitude of about 500 Å to 1000 Å (50-100 nm). Principally the reason for this inability appears to be that, at those film thicknesses, the tendency of the metal phase is to separate from the polymer phase because the metal phase is far thicker than the polymer film itself, which leads to cracking and progressive deterioration of the films. The various known methods also do not enable the arrangement of the metal phase in the respective systems to be influenced by the polymer morphology.

SUMMARY OF THE INVENTION

It is an object of the present invention, therefore, to provide a novel class of oriented thin (500 Å to 1000 Å) polymer/metal films and a novel method of producing the same.

Another object of the present invention is to provide such a method in which a metal-organic compound (MOC) is used to provide the metal-rich regions in the polymer body of the film and the arrangement of the MOC in the film is determined by the polymer morphology, under the influence of an externally applied controlled treatment of the film during crystallization of the polymer.

It is also an object of the present invention to provide such films which can be made into various types of industrial products having physical properties determined both by the relative proportions of the polymer and the MOC in the film and by the arrangement and form of the MOC component of the film.

Generally speaking, the objectives of the present invention are attained by a film-forming method which comprises the steps of sequentially dissolving first a polymer and then a metal-organic compound in a solvent in which both are soluble, thereby to form an emulsion having a discontinuous phase consisting of finite globules of the MOC solution dispersed in a continuous phase consisting of the polymer solution, depositing a quantity of the emulsion on a supporting surface to form a film thereon, permitting at least a part of the solvent to evaporate from the film, and thereafter subjecting the film, while substantially all remaining solvent therein evaporates, to a controlled treatment for effecting in and throughout the film a desired arrangement of the metal phase corresponding to the film properties sought to be achieved. It should be understood, however, that the formation of the globules of MOC solution as a discontinuous phase in the emulsion does not preclude, and in fact is ordinarily accompanied by, the entry of small quantities of the MOC into the polymer solution where the MOC attaches itself to the macromolecules of the polymer.

In accordance with one variant of the present invention, the controlled treatment comprises the application of a strain to the film after it has been separated from the supporting surface and is drying, to effect an orientation of the film through an elongation and orientation of the polymer molecules. In another variant of the invention, where the metal component of the MOC is magnetic, the treatment comprises the application of a magnetic field to the film while it is on the supporting surface and drying, with the field being either parallel or perpendicular to the plane of the film, to effect a texturing of the film (i.e., to produce an oriented film). Here we do not intend to specify or to limit ourselves to a particular explanation of the phenomenon that the film becomes textured when subjected to a magnetic field, but we believe the reason may be the presence of magnetic metal not only in the metal-rich regions of the film (the locations of the MOC solution globules) but also in the polymer molecules at other locations in the film resulting from the aforementioned entry of quantities of the MOC into the polymer solution. The term "oriented film" thus will be used herein to denote a film which has been treated by being subjected to a strain as well as a film which has been treated by being subjected to a magnetic field, and the term should be so interpreted.

In accordance with further variants of the invention, the common solvent for the polymer and the MOC preferably is one in which both are readily soluble under the same ambient conditions, with a representative solvent of this type being xylene, and with the concentration of the polymer in the solution being between about 0.01% and about 5% by weight of the solution and the concentration of the MOC in the solution being between about 5% and about 60% by weight based on the weight of a solid MOC-polymer mixture (i.e., 30 wt.% MOC concentration=3 parts by weight of the MOC to 7 parts by weight of the polymer). Subject to these conditions, the polymer may be one which, when subjected to a strain, is characterized by crystallization either (a) through an extension of the polymer molecules in the direction of the strain, or (b) through lamellar growth of the polymer bidirectionally in a plane perpendicular to the direction of the strain and an accompanying extension of the polymer molecules in the direction of the strain, while the MOC may be one in which the metal component of the molecule is an either nonmagnetic or magnetic metal element. Within these parameters, a representative polymer of the first type is high molecular weight isotactic polybutene-1 (HMW PB-1) the monomer unit of which has the following form

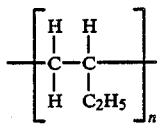

and a representative polymer of the second type is high density polyethylene (HDPE) the monomer unit of which has the following form

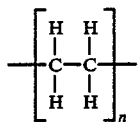

and representative MOCs are such as those set forth in the following table:

TABLE I

| Metal-Organic Compound | Structural Formula | Metal In Molecule (wt.%) |
| --- | --- | --- |
| Zinc diethyldithiocarbamate | $[CS_2N(CH_2CH_3)_2]_2Zn$ | 18 |
| Aluminum (2)ethylhexanoate | $[CH_3(CH_2)_3CH(C_2H_5)COO]_2AlOH$ | 8.5 |
| Silver cyclohexanebutyrate | $[C_6H_{11}(CH_2)_3COO]_2Ag$ | 38 |
| Copper cyclohexanebutyrate | $[C_6H_{11}(CH_2)_3COO]_2Cu$ | 16 |
| Ferric benzoylacetonate | $[C_6H_5COCH:C(CH_3)O]_3Fe$ | 10 |
| Cobalt cyclohexanebutyrate | $[C_6H_{11}(CH_2)_3COO]_2Co$ | 14 |
| Nickel cyclohexanebutyrate | $[C_6H_{11}(CH_2)_3COO]_2Ni$ | 14 |

The method of the present invention, by virtue of the derivation of each film-forming emulsion from a common solution of a polymer and a MOC, thus affords the substantial advantage of enabling the production of ultrathin oriented polymer films with high metal loadings in such a manner as to effectively eliminate the risk of cracking and progressive deterioration of the films. Such films are particularly well suited for use as dielectrics in capacitors and for that application are especially advantageous in that, by virtue of their extreme thinness, they enable higher capacitance values to be achieved than are attainable with thicker dielectrics. Uses of the films in other applications are also possible.

BRIEF DESCRIPTION OF THE DRAWING

In the drawing, which is basically schematic or diagrammatic in nature and should be viewed as such:

FIG. 1 is a schematic illustration, in perspective, of the principal aspects of a system for making a thin oriented polymer/MOC film according to the present invention;

FIG. 2 is a diagrammatic representation of a single needle crystal of pure HMW PB-1, illustrating the needle crystalline morphology of the polymer and the arrangement of the macromolecules within the crystalline regions when a strain is applied in the direction of the arrow;

FIG. 2a graphically represents the disposition of a globule of MOC solution as the discontinuous phase in an emulsion having a continuous phase constituted by a solution of HMW PB-1;

FIG. 2b graphically represents the transformation of the MOC solution globule in the emulsion of FIG. 2a into polycrystalline fibers within the mass of HMW PB-1 needle crystals constituting the thin oriented polymer film formed during the application of a strain to the HMW PB-1/MOC emulsion in the direction of the arrow;

DESCRIPTION OF THE PREFERRED EMBODIMENTS

Figure 2C:
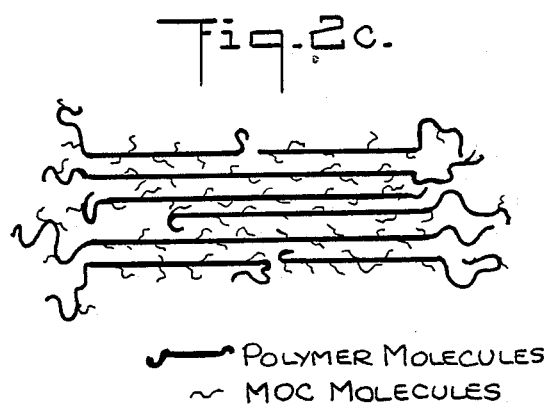
FIG. 2c is a diagrammatic representation, similar to FIG. 2, of a single needle crystal of HMW PB-1 containing MOC molecules and illustrates the arrangement of the MOC molecules between the macromolecules of the polymer.

The principles of the present invention will, we believe, be best comprehended from the following description of representative film-forming procedures using HMW PB-1 and HDPE as the polymers, the compounds listed in Table I as the MOCs, and xylene as the common solvent for the polymers and the MOCs.

Referring now to the drawing in greater detail, FIG. 2 illustrates graphically a single needle crystal of pure HMW PB-1 formed by the unidirectionally extended polymer macromolecules of a film thereof when the same is oriented by being subjected to a strain in the direction of the arrow A. Correspondingly, FIG. 3 illustrates graphically the partly crystalline and partly amorphous structure of an oriented film of pure HDPE formed when the same is subjected to a strain in the direction of the arrow B, showing the unidirectional extension of the polymer macromolecules in the direction of the applied strain as well as the lamellar growth (a chain folding within the lamellae) of the polymer bidirectionally in all directions of the arrow C in a plane perpendicular to the direction of the applied strain. In this context, it should be understood, the designation of the polymers as "pure" is intended only to indicate that they are free of MOCs and other comparable substances, not necessarily that they are chemically pure.

EXAMPLE 1

Three solutions of HMW PB-1 in xylene and three solutions of HDPE in xylene were prepared, each solution being maintained at a temperature of 140° C. and containing 0.4% by weight of the respective polymer. Thereafter, three different quantities of the Zn MOC set forth in Table I were added on the one hand to the three HMW PB-1 solutions and on the other hand to the three HDPE solutions, such that the respective amounts of the MOC solution in each type of solution were the equivalents of 10, 30 and 60% by weight of the MOC in a solid MOC-polymer mixture. The Zn MOC being itself also soluble in xylene, the resulting solutions were emulsions of globules of the MOC solution dispersed in the various polymer solutions, as is graphically illustrated in FIG. 2a for the HMW PB-1/MOC solution and in FIG. 3a for the HDPE/MOC solution.

The various solutions were then formed into respective films by means of a system 10 such as is illustrated schematically in FIG. 1 and basically comprising a glass plate 11 defining a supporting surface, means (not shown) for heating the supporting surface, and a take-up roll 12, utilizing a procedure essentially following the method developed by Petermann and Gohil. Thus, in each case a few milliliters of the respective emulsion were deposited onto a clean glass plate so as to form thereon a thin film 13. The plate was maintained at the solution temperature (140° C.), and a portion of the xylene was permitted to evaporate from the film during an interval of a few (e.g., 3–5) seconds. The evaporated portion of the xylene was primarily constituted by the solvent of the polymer solution, because the rate of evaporation from the continuous phase of the emulsion is higher than the rate of evaporation from the discontinuous phase due to the fact that the globules of MOC solution are surrounded by the polymer solution.

At the end of the preliminary drying interval, i.e., after about 5 seconds, the somewhat tacky thin film 13 on the plate 11 was contacted by the takeup roll 12 and the latter, with an end region of the film adhering thereto, was picked up and displaced away from the plate in the direction of the arrow D at a rate of a few (approximately 1–6) cm/sec to exert a strain on the film. During the drawing operation, the remaining xylene present in the picked up film 13a evaporated and a dried and solid, highly oriented film about 80 nm (800 Å) thick was obtained which could be wound up on the take-up roll 12 without risk of adhesion between the turns of the film.

By virtue of the extreme thinness of these films, resulting from their production by the method of the present invention, they were electron transparent. It was possible, therefore, to study them with a transmission electron microscope (TEM). For this purpose, a Philips EM 430 T transmission electron microscope was used (which was operated at 200 kV in order to minimize beam damage to the samples). In conjunction therewith, energy dispersive x-ray analysis (EDAX) was performed with a Philips EDAX PV 9900 system (using the STEM attachment therefor in point mode in order to permit selection and examination of small areas on the samples).

Figure 3:
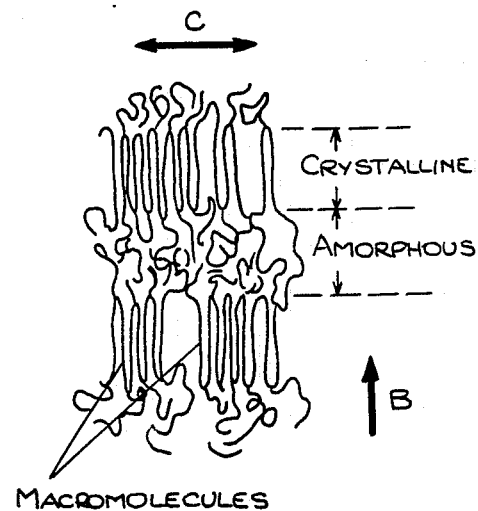
FIG. 3 is a diagrammatic representation of the morphology of pure HDPE when a strain is applied in the direction of the arrow and shows the crystalline lamellae and adjacent amorphous regions of the polymer.
Figure 3A:
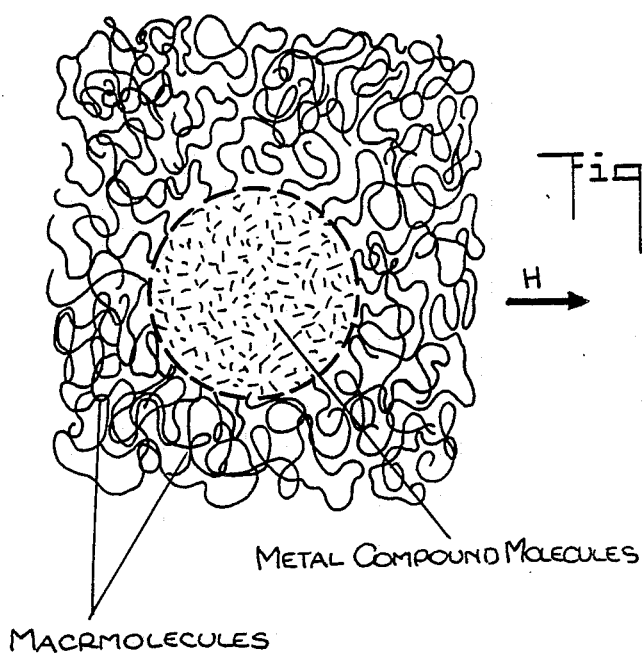
FIG. 3a graphically represents the disposition of a globule of MOC solution as the discontinuous phase in an emulsion having a continuous phase constituted by a solution of HDPE.
Figure 2D:
FIG. 2d is a bright field transmission electron micrograph, obtained on a transmission electron microscope (TEM), of a HMW PB-1/Zn MOC film according to the present invention made from a solution with a 30 wt.% zinc compound loading.

Based on these studies, it appears that the HMW PB-1/Zn MOC films have essentially the same structure and morphology as the pure HMW PB-1 films represented by FIG. 2 but differ therefrom in that they contain within them (see FIG. 2c) fibers of various lengths of the zinc compound. The TEM micrograph of such a film made from a solution with a loading of 30% by weight of the zinc compound (FIG. 2d) shows that the MOC fibers are aligned in the direction of the needle crystals of the HMW PB-1, which is also the direction of drawing designated by the arrow E, i.e., the orientation direction, and that the packing density of the crystallites (single-crystal grains) within the MOC (the selected area electron diffraction pattern of the fibers, which is not shown, indicates that the fibers are polycrystalline regions) decreases in the pull direction. The observations of comparable TEM micrographs of thin oriented HMW PB-1/Zn MOC films with the mentioned higher and lower zinc compound loadings do not lead to any different conclusions.

In this connection it should be pointed out that a possible explanation of the above-described morphology of the HMW PB-1/Zn MOC films may be the following. As previously mentioned, when the film-forming emulsion consisting of the discontinuous phase of finite globules of the MOC solution dispersed in the continuous phase of the polymer solution is deposited onto the hot glass plate, most of the xylene evaporates from the continuous phase within 3 to 4 seconds while evaporation from the globules is slower due to the continuous phase surrounding the globules of the MOC solution. Seed crystals can then form in the globules of the MOC solution either before or after the drawing of the film starts, and they can act as nuclei for further crystallization. Evaporation of the xylene from the globules proceeds much faster during drawing than before and is completed at the end of the drawing process when the fibers of solid MOC are formed in the polymer film.

In the case of HMW PB-1, the polymer macromolecules are extended during pulling and start to form needle crystals during film formation. These molecules, which before the start of the drawing process are crosslinked with the zinc compound at the interface between the polymer and each MOC globule (see FIG. 2a), exert a force on the globules in the pull direction, i.e., the direction of the arrow F. Thus, the globules get elongated (see FIG. 2b). During this process, growth of zinc diethyldithiocarbamate crystals takes place, starting from the previously formed seed crystals. This results in the observed polycrystalline metal fibers which show good wettability with and hence excellent adhesion to the surrounding polymer.

Figure 3B:
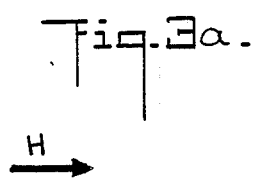
FIG. 3b graphically represents the transformation of the MOC solution globule in the emulsion of FIG. 3a into a roughly spherical polycrystalline aggregate within the HDPE lamellae constituting the thin oriented polymer film formed during the application of a strain to the HDPE/MOC emulsion in the direction of the arrow.
Figure 3B:
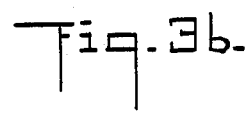
Figure 3C:
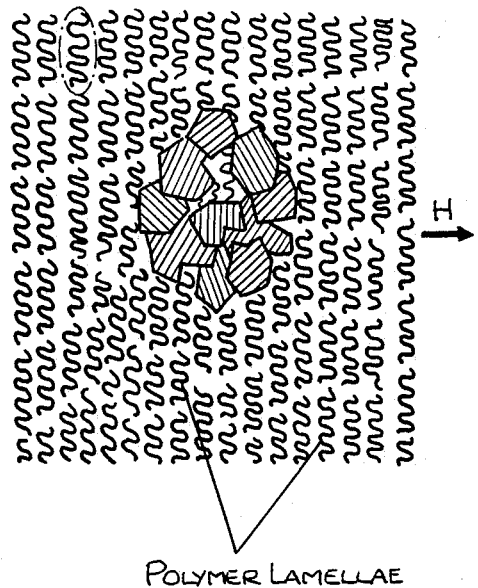
FIG. 3c is an enlarged graphic representation of one of the polymer lamellae shown in the circled area of FIG. 3b and illustrates the growth of the polymer macromolecules in the direction of the strain and the lamellar growth of the polymer in directions perpendicular to the direction of the strain.
Figure 3C:
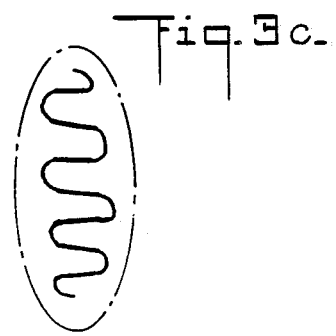
Figure 3D:
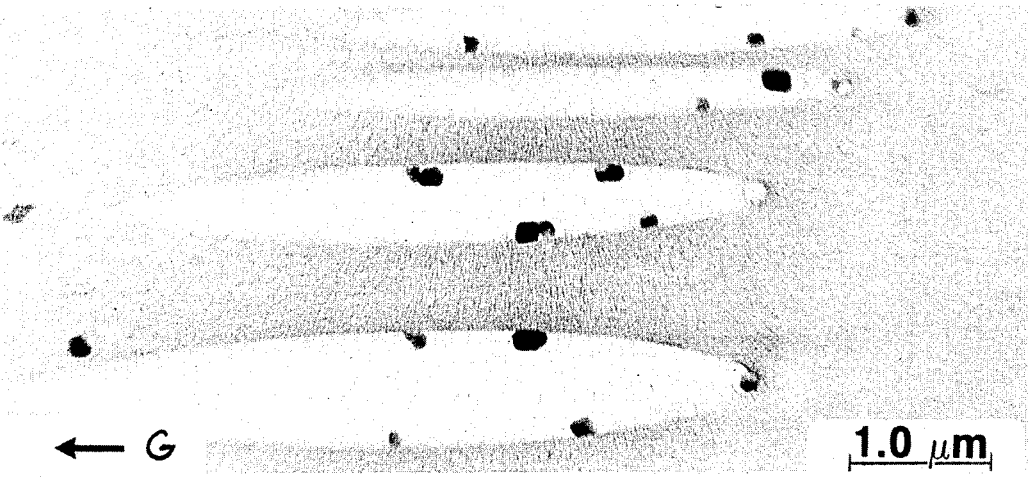
FIGS. 3d, 3e and 3f are bright field TEM micrographs of HDPE/Zn MOC films according to the present invention made from solutions with, respectively, 10%, 30% and 60% by weight zinc compound loadings.
Figure 3E:
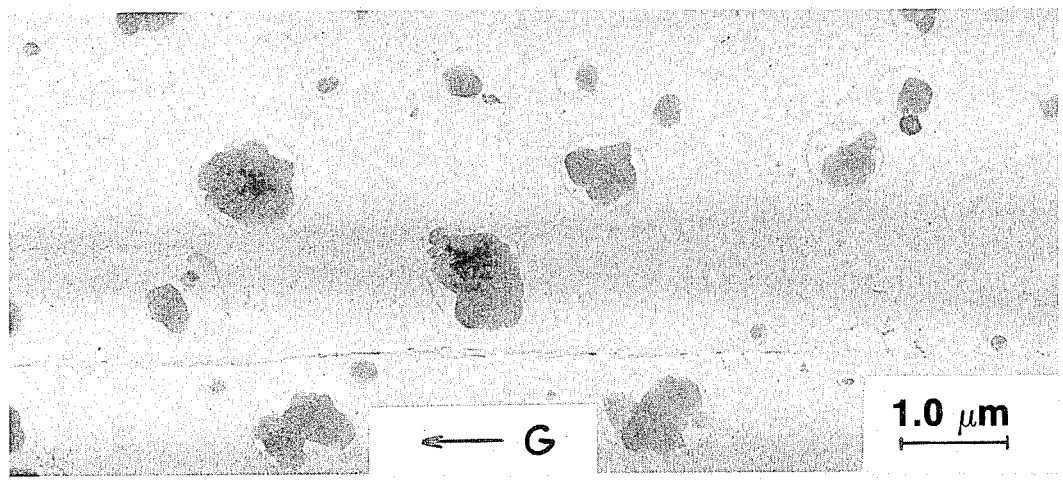
Figure 3F:
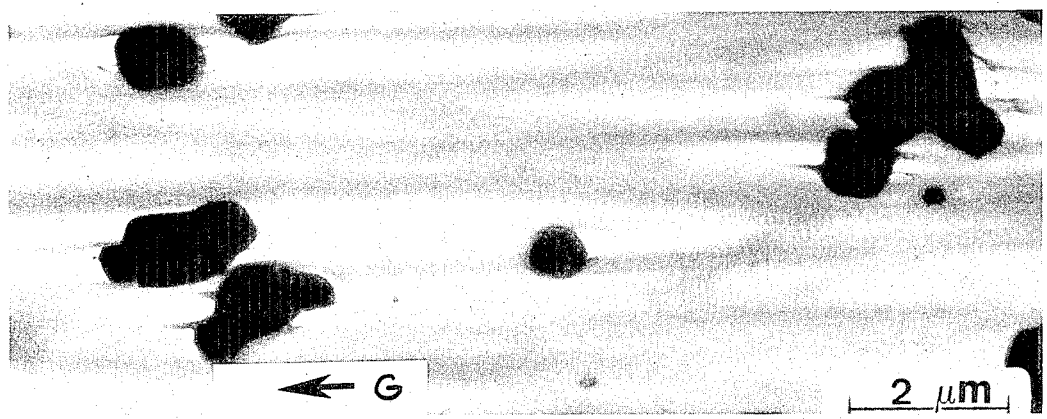

In the case of HDPE, on the other hand, the TEM micrographs (FIGS. 3d, 3e and 3f), in each of which the pull direction is indicated by the arrow G, show definite differences in the film structure depending on the degree of Zn MOC loading in the original solution. Thus, at a low (10 wt.%) loading of the zinc compound, primarily single zinc diethyldithiocarbamate crystals are formed which become embedded in the polyethylene; the well-defined shape of the individual crystals (see FIG. 3d) reflects their single-crystalline character. An increase of the Zn MOC content of the solution to 30 wt.%, by way of contrast, leads more generally to the formation of roughly spherical clusters of zinc compound crystals each consisting of several crystallites which are attached to each other (see FIG. 3e); the cluster sizes, which in some instances are barely differentiable from the crystal sizes seen in FIG. 3d, range between about 0.2 /μm and 1.0 μm. When the zinc compound loading in the solution reaches 60 wt.%, however (see FIG. 3f), a marked increase in cluster size, ranging between about 0 7 μm and 3.6 μm, is detected, although the cluster density (the number of clusters per unit area) has not changed significantly between FIGS. 3e and 3f. In addition, whereas the aggregates in all three HDPE films are roughly spherical, in the film of FIG. 3f the aggregates, by virtue of their size, are much more spherical than in the films of FIGS. 3d and 3e, and the associated diffraction patterns (not shown) indicate that the aggregates are clearly polycrystalline.

The fact that in the HDPE/Zn MOC films the zinc compound forms roughly spherical generally polycrystalline aggregates in the solid film after drawing indicates that the MOC solution globules (see FIG. 3a) in the starting emulsion remain unaltered in shape during crystallization (see FIG. 3b) when a strain is applied to the film in the direction of the arrow H. From this we conclude that the polyethylene molecules exert no force on the MOC globules during the drawing process. A reason for this might be the lamellar growth of this polymer during crystallization. Though the polymer macromolecules grow in the direction of the strain, the lamellae within the film (see also FIG. 3c) grow bidirectionally in all directions in a plane perpendicular to the pull direction, and thus no resultant force acts on the globules to deform them.

EXAMPLE 2

Three solutions of HMW PB-1 in xylene and three solutions of HDPE in xylene were prepared as in Example 1, each solution being maintained at a temperature of 140° C. and containing 0.4% by weight of the respective polymer. Thereafter, sufficient quantities of the Al, Ag and Cu MOCs set forth in Table I were added to the respective polymer solutions to obtain resulting solutions, in the form of emulsions of globules of the various MOC solutions dispersed in the various polymer solutions (see FIGS. 2a and 3a), having the polymer/MOC compositions and the MOC weight fractions set forth in Table II.

TABLE II

| Polymer | MOC | MOC weight (wt. %) |
|---|---|---|
| HMW PB-1 | Aluminum (2)ethylhexanoate | 30 |
| HDPE | " | 30 |
| HMW PB-1 | Silver cyclohexanebutyrate | 30 |
| HDPE | " | 30 |
| HMW PB-1 | Copper cyclohexanebutyrate | 20 |
| HDPE | " | 20 |

The various emulsions were then formed into respective thin oriented films by means of the same system (see FIG. 1) and procedure as described in Example 1 above, and were likewise studied with the aid of the Philips EM 430 T transmission electron microscope and the Philips EDAX PV 9900 energy dispersive x-ray analysis system.

Figure 3G:
FIGS. 3g and 3h are bright field TEM micrographs of, respectively, HMW PB-1 and HDPE films according to the present invention made from solutions with 30 wt.% aluminum compound loadings.
Figure 3H:
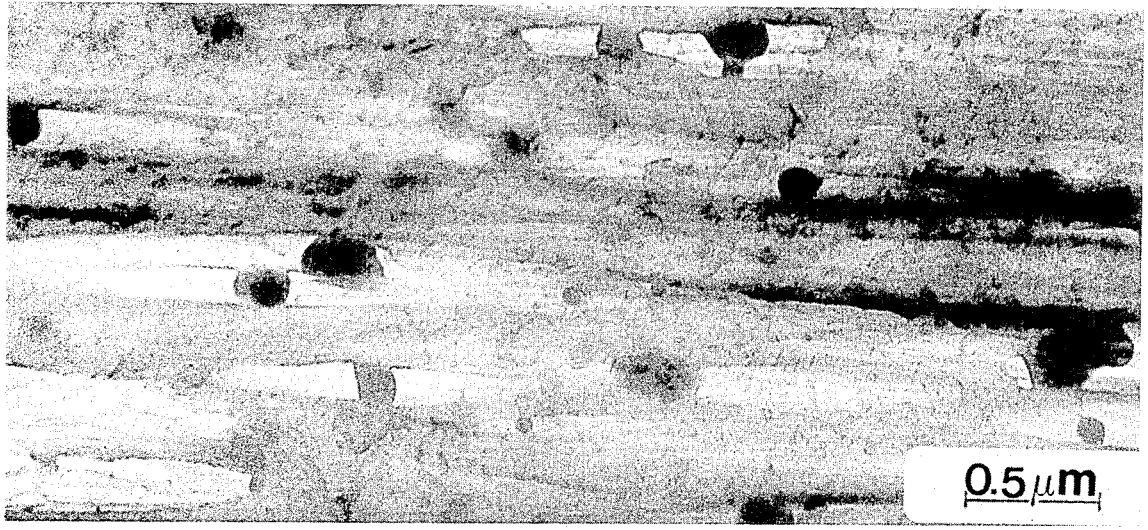

TEM micrographs of oriented HMW PB-1 and HDPE films containing the aluminum compound are shown in FIGS. 3g and 3h, respectively In the case of the HMW PB-1 film, numerous small dark domains representing aluminum compound can be seen in FIG. 3g along with the oriented needle crystals of the polymer, with the aluminum domains being generally somewhat inclined in the direction of the polymer orientation. In the case of the HDPE film, FIG. 3h shows, among the polyethylene lamellae, a number of dark domains of roughly spherical configuration which vary considerably in size.

Figure 3I:
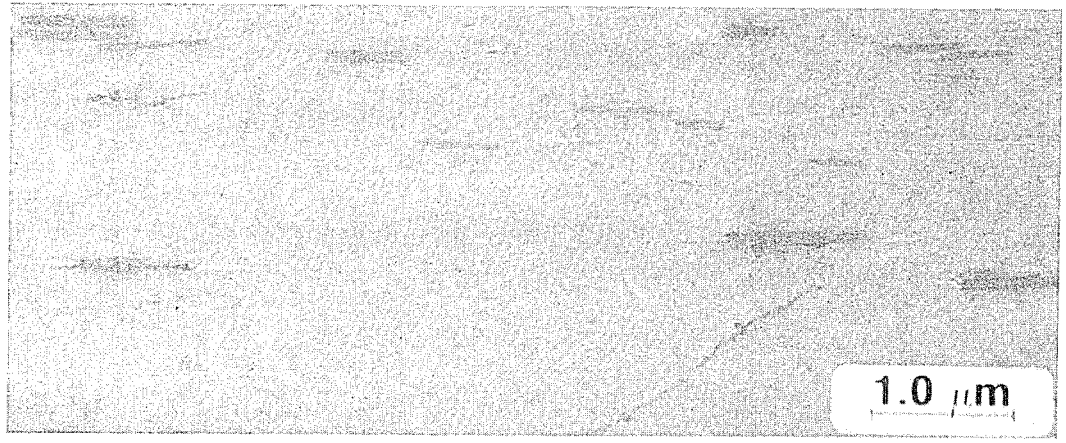
FIGS. 3i and 3j are bright field TEM micrographs of, respectively, HMW PB-1 and HDPE films according to the present invention made from solutions with 30 wt.% silver compound loadings.
Figure 3J:
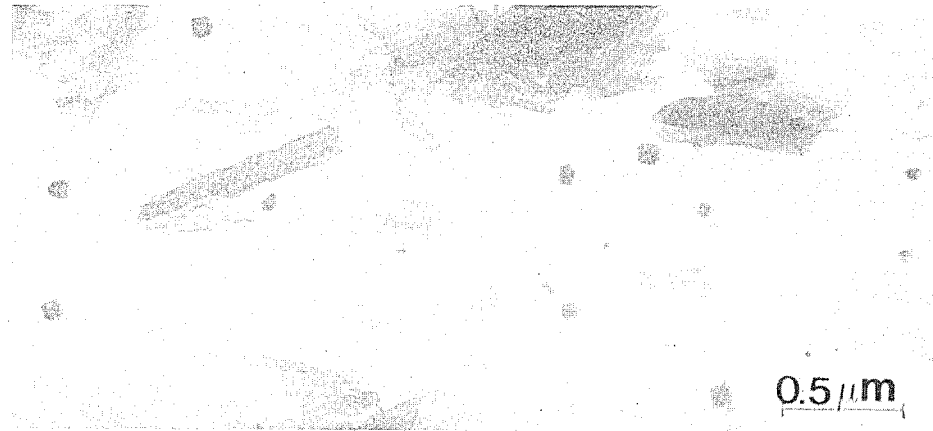

The TEM micrographs of silver compound-loaded HMW PB-1 and HDPE films are shown in FIGS. 3i and 3j, respectively. From FIG. 3i it is evident that the Ag MOC is oriented in the orientation direction of the film, i.e., the direction of the polymer needle crystals. The metal fibers are roughly ½ μm long and 0.4 μm wide. Upon high magnification, numerous single particles, oriented along the orientation direction, are visible, although some of these particles seem to have coalesced from smaller ones into somewhat larger aggregates during the film formation. The presence of silver in these regions was confirmed by EDAX. FIG. 3j shows, in the morphology of an oriented HDPE film, the presence of numerous small roughly spherical domains as well as large flakelike areas, which were identified (by EDAX) as silver-rich regions. In addition to the reflections of the HDPE, the diffraction pattern (not shown) indicates the presence of some weak spots resulting from the silver compound particles, and this indicates a certain degree of crystalline order.

Figure 3K:
FIGS. 3k and 3m are bright field TEM micrographs of, respectively, HMW PB-1 and HDPE films according to the present invention made from solutions with 20 wt.% copper compound loadings.
Figure 3M:
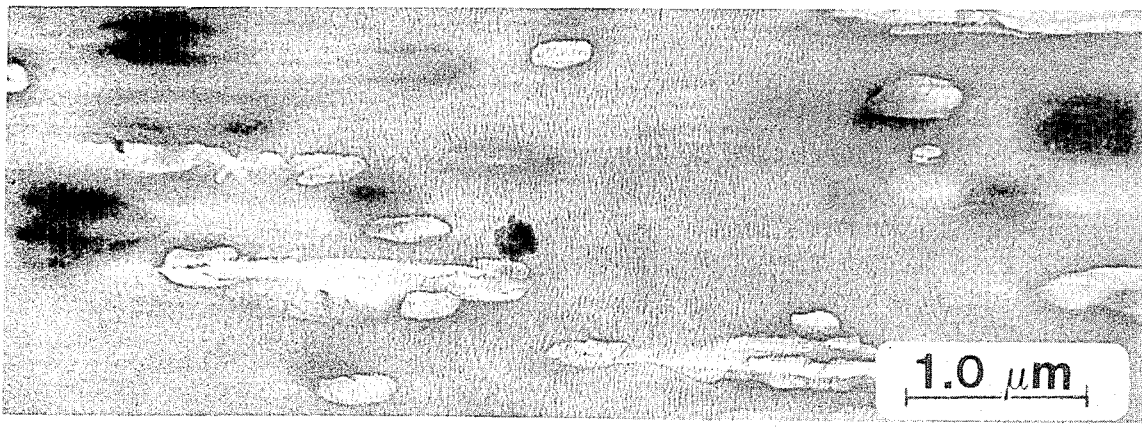

The TEM micrographs of FIGS. 3k and 3m show the morphologies of oriented HMW PB-1 and HDPE films containing the copper compound. Both morphologies reveal the presence of slightly deformed spherical domains with their long axes being aligned in the direction of film orientation, which is also the polymer chain direction. In the case of the HMW P-1 films, very thin metal compound fibers (about 20 nm in diameter and several microns long) were also observed, the fibers being precisely aligned in the orientation direction.

We conclude from the results of Example 2 that in the oriented thin polymer/MOC films, which like those described in Example 1 were drawn from a common solution of both components and subjected to a strain, the arrangement of the MOC in the films is strongly affected by the morphology of the polymer macromolecules. While in the case of oriented lamellar HDPE, no pronounced orientation of the MOC was observed, in the case of needle crystalline HMW PB-1, a preferred orientation of the MOC in the films was detected. Also, diffraction patterns show that some crystalline order exists in the metal organic compound. It might also be concluded from the results that reactive sidegroups of the polymer molecules act as crosslinking sites for the organic part of the MOC. This would explain the observed interaction between the polymer morphology and the MOC arrangement in the case of HMW PB-1, with its $C_2H_5$ sidegroups.

It should be noted here that oriented film-forming procedures essentially identical with those described in Examples 1 and 2 have also been performed utilizing the Fe and Co MOCs set forth in Table I. The results were comparable to those achieved with the indicated Zn, Al, Ag and Cu MOCs. We conclude from this that making thin oriented polymer/MOC films according to the present invention by application of a physical strain or pull to a film derived from a common solution of the polymer and the MOC is feasible irrespective of whether the metal component of the MOC is a magnetic or a nonmagnetic element.

EXAMPLE 3

A solution of HMW PB-1 in xylene was prepared, the solution being maintained at a temperature of 140° C. and containing 0.1% by weight of the polymer. Thereafter, a sufficient quantity of the Fe MOC set forth in Table I was added to the polymer solution to obtain a resulting solution, in the form of an emulsion of globules of the Fe MOC solution dispersed in the polymer solution (see FIG. 2a), in which the iron compound was 30% by weight of the total solids dissolved.

Three thin films of the emulsion were then formed on respective supporting surfaces (in this case each constituted by a carbon-coated TEM copper grid) which were held at a constant temperature of 140° C. Slow cooling of the films to room temperature was permitted to take place at a cooling rate of 0.5° C./min, with one of the films being subjected, during the cooling process, to a 4.0 kGauss magnetic field applied parallel to the plane of the grid, a second one of the films being subjected, during the cooling process, to a 8.2 kGauss magnetic field applied perpendicular to the plane of the grid, and the third film being permitted to cool without being subjected to a magnetic field.

As in Examples 1 and 2, the films were then studied with the aid of the Philips EM 430 T transmission electron microscope and the Philips EDAX PV 9900 energy dispersive x-ray analysis system.

Figure 3N:
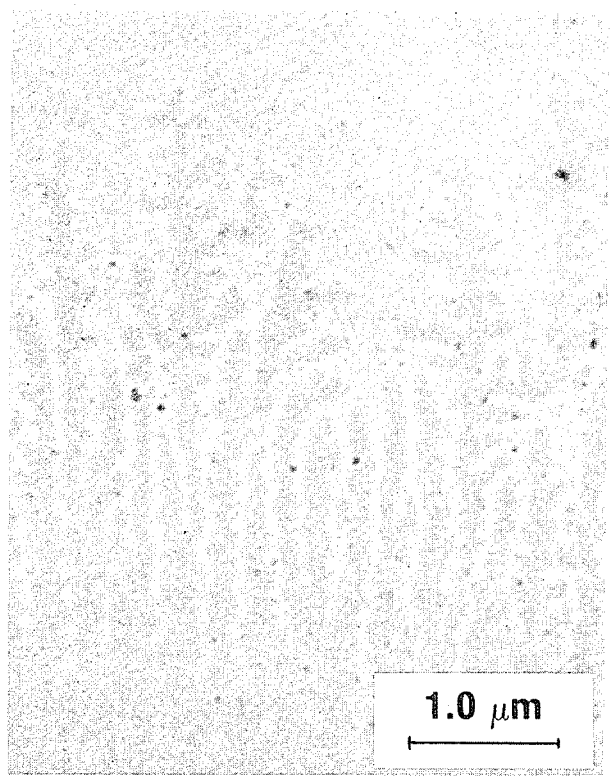
FIG. 3n is a phase contrast TEM micrograph of a thin HMW PB-1/Fe MOC film prepared without the application of a magnetic field during cooling.

With respect to the film cooled in the absence of a magnetic field, the TEM micrograph of FIG. 3n shows that the HMW PB-1 formed irregular dendritic crystals which grew in two directions perpendicular to each other (Dendritic growth of polymers has been extensively investigated and it is commonly acknowledged that the creation of new fold planes during crystal growth leads to the appearance of dendrites.) Circular domains were observed within the polymer film which were identified (by EDAX) as iron-rich regions. The iron-rich domains within the polymer film were, however, found to concentrate at the edges of the TEM grid bars instead of being spread uniformly throughout the film.

Figure 3P:
FIGS. 3p and 3q are bright field TEM micrographs of two films of the same composition as the film represented by FIG. 3n but prepared one with an application of a magnetic field parallel to the plane of the supporting surface during cooling and the other with an application of a magnetic field perpendicular to the plane of the supporting surface during cooling.

The influence of a magnetic field applied parallel to the plane of the substrate during cooling is shown in the TEM micrograph of FIG. 3p. Dendrites were no longer present, but rather a homogeneous film with alignment of boundaries parallel to each other was seen. Again there were circular domains which were identified (by EDAX) as iron-rich regions, but in this case they were homogeneously distributed over the entire area. This result is believed to be due to the fact that the applied magnetic field engenders a movement of the iron-rich regions in the plane of the film during the crystallization stage. Orientation of the film can be seen from the micrograph. Texturing was confirmed from electron diffraction patterns.

Figure 3Q:

As shown in the TEM micrograph of FIG. 3q, a difference is observed in the structure of the film when the magnetic field is applied perpendicular to the plane of the grid. The direction of the magnetic field in this case is such, that it effectively pins ironrich regions in place relative to the substrate upon the solution being deposited onto the grid and prevents their movement in the plane of the substrate during cooling and film formation. The spherical regions seen in FIG. 3q contain several domains of iron-rich material. This, and the fact that these regions are larger than the individual domains seen earlier, suggest that coalescence of iron-rich domains within the polymer takes place during solidification along with a uniform distribution of the larger regions throughout the plane of the film. Electron diffraction confirmed once again that the film was textured.

It can be extrapolated from the foregoing description of the HMW PB-1/Fe MOC film morphology that similar results will obtain in films formed with other MOCs the metal component of which is a magnetic element, e.g., with the Co MOC and the Ni MOC set forth in Table I.

Films according to the present invention are suited for use as dielectrics in capacitors, with the presence of a greater or lesser MOC loading providing the dielectric with an appropriately modified dielectric constant. Such films appear further useful as shielding materials for sensitive devices such as integrated circuits to protect the same against exterior electromagnetic interference. Films where the metal component of the MOC is magnetic, especially iron, may also find use in such applications as magnetic memory devices, electromagnetic wavelength selectors, and the like. It will also be understood that a thin oriented film according to the present invention can be laid over itself, e.g., by being wound or folded, so as to form a final film of a much greater thickness, e.g., 0.5 mm.

We claim:

1. An oriented crystalline polymer/metal-organic compound film,
    (a) said film consisting of (i) an oriented solid continuous polymer matrix (ii) having discontinuous regions of a metal-organic compound (MOC) finely dispersed therein,
    (b) said film having a thickness in the range of about 500 Å to 1000 Å,
    (c) the polymeric component of said film being a polymer selected from the group consisting of (i) high molecular weight polybutene-1 and (ii) high density polyethylene,
    (d) the MOC component of said film being a MOC selected from the group consisting of (i) zinc diethyldithiocarbamate, (ii) aluminum (2)ethylhexanoate, (iii) silver cyclohexanebutyrate, (iv) copper cyclohexanebutyrate, (v) ferric benzoylacetonate, (vi) cobalt cyclohexanebutyrate, and (vii) nickel cyclohexanebutyrate, and (e) said film, prior to being solidified and oriented, being formed from a liquid emulsion which includes (i) as a continuous phase a solution of said polymer in xylene with (ii) the concentration of the polymer in the solution being between about 0.1% and 5% by weight based on the weight of the solution, and which includes (iii) as a discontinuous phase a multiplicity of finite globules of a solution of said MOC in xylene with (iv) the concentration of the MOC in the solution being between about 5% and 60% by weight based on the weight of a solid MOC-polymer mixture and with (v) said globules being finely dispersed in said solution of said polymer in xylene.

2. A film as claimed in claim 1, wherein said polymer is high molecular weight isotactic polybutene-1.

3. A film as claimed in claim 1, wherein said polymer is high density polyethylene.

4. A film as claimed in claim 1, wherein said polymer matrix is in the form of needle crystals of said polymer having polycrystalline fibers of said MOC strongly adhered to said polymer needle crystals.

5. A film as claimed in claim 1, wherein said polymer matrix is in the form of needle crystals of said polymer having MOC molecules contained within and strongly adhered to the macromolecules of said polymer needle crystals.

6. A film as claimed in claim 1, wherein said MOC is present in and distributed throughout the film in the form of roughly spherical polycrystalline aggregates strongly adhered to the polymer crystals.

7. A film as claimed in claim 1, wherein said MOC is zinc diethyldithiocarbamate.

8. A film as claimed in claim 1, wherein said MOC is aluminum (2)ethylhexanoate.

9. A film as claimed in claim 1, wherein said MOC is silver cyclohexanebutyrate.

10. A film as claimed in claim 1, wherein said MOC is copper cyclohexanebutyrate.

11. A film as claimed in claim 1, wherein said MOC is ferric benzoylacetonate.

12. A film as claimed in claim 1, wherein said MOC is cobalt cyclohexanebutyrate.

13. A film as claimed in claim 1, wherein said MOC is nickel cyclohexanebutyrate.

14. A dielectric for a capacitor, comprising a film as claimed in any one of claim 1–13.

* * * * *